United States Patent [19]

Madison et al.

[11] 4,164,592

[45] Aug. 14, 1979

[54] FRIED FOODS

[75] Inventors: Bryan L. Madison; Joel I. Shulman, both of Cincinnati, Ohio

[73] Assignee: The Procter & Gamble Company, Cincinnati, Ohio

[21] Appl. No.: 805,666

[22] Filed: Jun. 13, 1977

[51] Int. Cl.$^2$ .......................... A23D 5/04; A23L 3/34
[52] U.S. Cl. .................... 426/547; 426/644; 426/438
[58] Field of Search .............. 426/547, 601, 644, 438; 260/570.5 P, 606.5 P, 609 R, 80 PS

[56] References Cited

U.S. PATENT DOCUMENTS

| | | | |
|---|---|---|---|
| 2,123,863 | 7/1938 | Royce | 426/547 |
| 3,065,210 | 11/1962 | Abramo et al. | 260/80 PS |
| 3,152,104 | 10/1964 | Rabinowitz et al. | 260/606.5 X |
| 3,361,830 | 1/1968 | vanGhemen et al. | 260/606.5 |
| 3,390,189 | 6/1968 | vanGhemen et al. | 260/606.5 |
| 3,518,312 | 6/1970 | Maier | 260/606.5 |
| 3,652,678 | 3/1972 | Allum et al. | 260/606.5 |
| 3,657,298 | 4/1972 | King | 260/440 |
| 3,839,507 | 10/1974 | Hechenbleikner et al. | 426/547 X |

*Primary Examiner*—Robert A. Yoncoskie
*Attorney, Agent, or Firm*—Jerry J. Yetter; Richard C. Witte; Thomas H. O'Flaherty

[57] ABSTRACT

The disclosed process is a method for improving the flavor of fried foods, especially chicken, by frying said food in an oil or fat containing a compound which prevents the build-up of hydroperoxides of fatty acids and esters thereof and the decomposition products of the hydroperoxides in both the oil and the food.

6 Claims, No Drawings

FRIED FOODS

BACKGROUND OF THE INVENTION

Fats and oils which contain unsaturated fatty acids are oxidized by heat/oxygen to hydroperoxides. During a cooking process, these hydroperooxides further polymerize and/or decompose to form various organoleptically undesirable aldehydes, acids and ketones. This problem is especially acute in high temperature frying, and the presence of the hydroperoxides and their decomposition products causes the oil or fat and the foods fried in it to develop off-flavors.

Antioxidants, for example, the tocopherols, BHA, BHT, and citric acid inhibit the oxidation of the fatty acids in cooking oils, but do not prevent the formation and decomposition of hydroperoxides. In the presence of heat and oxygen, hydroperoxides are readily formed from the unsaturated fatty acids native to frying oils and certain foods. Indeed, if foods are fried in an oxygen-free atmosphere, such as under a blanket of nitrogen, carbon dioxide, or other inert atmosphere, hydroperoxide formation is prevented and the food has an improved flavor.

It is an object of this invention to improve the flavor of fried foods by inhibiting the formation of hydroperoxides of fatty acids in both the oil/fat used for cooking (especially frying) and in the food itself.

It is an object of this invention to provide a method of frying foods containing unsaturated fatty acids, particularly chicken, to improve the flavor of the food.

SUMMARY OF THE INVENTION

A process for improving the flavor of fried foods containing fatty acids and esters thereof comprising cooking (especially frying) said food in a fat or oil containing a compound of the type disclosed hereinafter which inhibits the build-up of hydroperoxides of fatty acids and esters thereof is disclosed.

DETAILED DESCRIPTION OF THE INVENTION

The flavor of fried foods can be improved by frying the food in a fat or oil containing a safe and effective amount of hydroperoxide inhibitor.

By "safe and effective amount" is meant an amount of inhibitor which substantially prevents the build-up of hydroperoxides in materials, especially fats and oils containing unsaturated fatty acids. For food use in fats and oils, an amount in the range of about 10 to 1000 ppm is effective and safe for ingestion by humans and lower animals. The amount used will depend upon several factors, including the amount of unsaturation in the fatty acid fats or oils and the presence of other antioxidants in the fats or oils.

By "fatty acids" are meant the monobasic carboxylic acids derived from natural fats or oils. Both saturated and unsaturated fatty acids are included in this definition. The esters of these fatty acids may be monoesters or polyesters. Most natural fats and oils contain glyceryl esters of fatty acids.

By "aryl" herein is meant hydrocarbon substituents containing the aromatic nucleus, e.g., phenyl or naphthyl.

By "substituted aryl" herein is meant that aryl moiety in which a hydrogen has been replaced by an alkyl radical, an alkoxyl radical, a thioalkyl radical, a halogen or other substituent which, itself, will not react with oxygen to produce undesirable hydroperoxide compounds. When the compounds herein are used as antioxidants in foods containing fats or oils, the phenyl group is preferred.

By "comprising" herein is meant that various other compatible ingredients may be present in the compositions in such a proportion as will not adversely affect the stability and the hydroperoxide inhibiting effectiveness of the basic food composition. The term "comprising" thus encompasses and includes the more restrictive terms "consisting of" and "consisting essentially of" within its scope.

Poultry, especially chicken, contains a large amount of fatty acids and esters near the surface of the meat, especially in the skin. During frying, the presence of heat and oxygen from the air produces the hydroperoxides of these fatty acids. The hydroperoxides decompose to form polymers, various undefinable gummy materials, aldehydes, acids, ketones, etc., which causes the development of off-flavors and off-odors in the food. The fatty acids and esters which are found in the cooking oil or fat also can be oxidized in the presence of heat and oxygen to similar hydroperoxides of fatty acids which likewise decompose and undesirably affect the flavor of foods (chicken) cooked therein.

In the process of this invention, the food, particularly poultry, is fried in a fat or oil containing a compound which inhibits the formation of hydroperoxides of fatty acids both in the cooking oil and in the food itself. Oligomeric or polymeric phosphine compounds containing the moiety

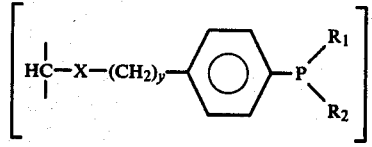

wherein X is selected from the group of oxygen, sulfur, and nitrogen, and $R_1$ and $R_2$ are each selected from the group of aryl and substituted aryl and y is an integer from 1 to 3; and those compounds of the general formula

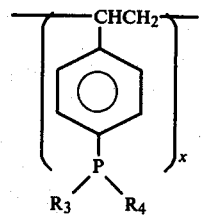

wherein x is an integer of from 2 to about 15 and $R_3$ and $R_4$ are each selected from the group of aryl and substituted aryl are compounds which inhibit the build-up of the undesirable fatty acid hydroperoxides.

Monomeric phosphines, and in particular triphenylphosphine, are toxic and not suitable for use in edible fats and oils. Polymeric phosphine compounds of the type mentioned above are neither digested nor absorbed after oral ingestion. Preferred for use herein are the polymeric triaryl- or substituted triarylphosphine compounds with a molecular weight from about 600 to about 3000. Compounds with molecular weights substantially above this range are not effective in preventing hydroperoxide formation. Those polymeric phosphine compounds having a molecular weight below about 600 are easily absorbed from the digestive tract of animals and could be metabolized to produce toxic compounds.

Preferred oligomeric and polymeric triarylphosphines and substituted triarylphosphine compounds for use as antioxidants are those derived from polyols. These polyol based triarylphosphine polymers are preferred because they can be made from readily available starting materials. Suitable polyols are glycols, glycerol, sugar alcohols, sugars, including monosaccharides, disaccharides, trisaccharides, and tetrasaccharides, among others, and other polyols, for example, pentaerythritol.

Compounds of the formula

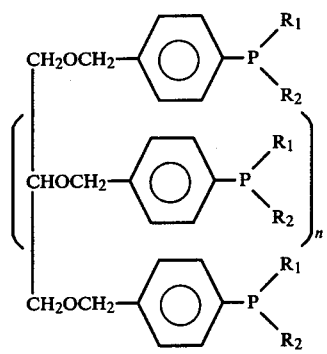

where n is an integer from 0 to 4 and $R_1$ and $R_2$ are each selected from the group of aryl or substituted aryl, are easily prepared from glycols, glycerols and sugar alcohols.

The following reaction scheme is used:

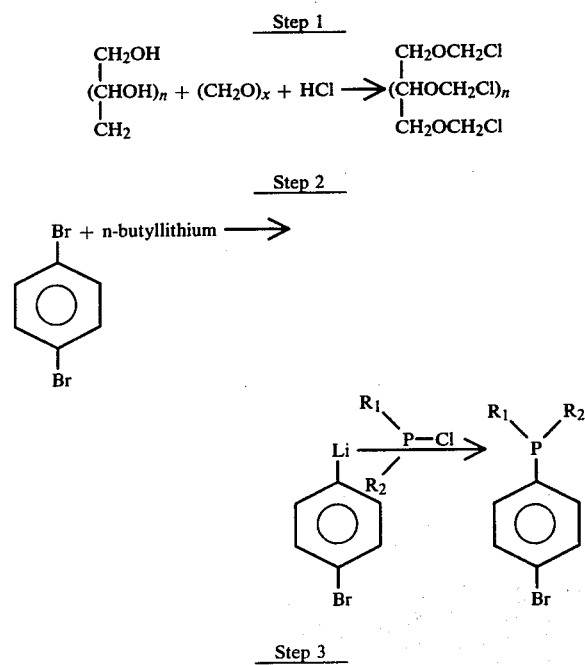

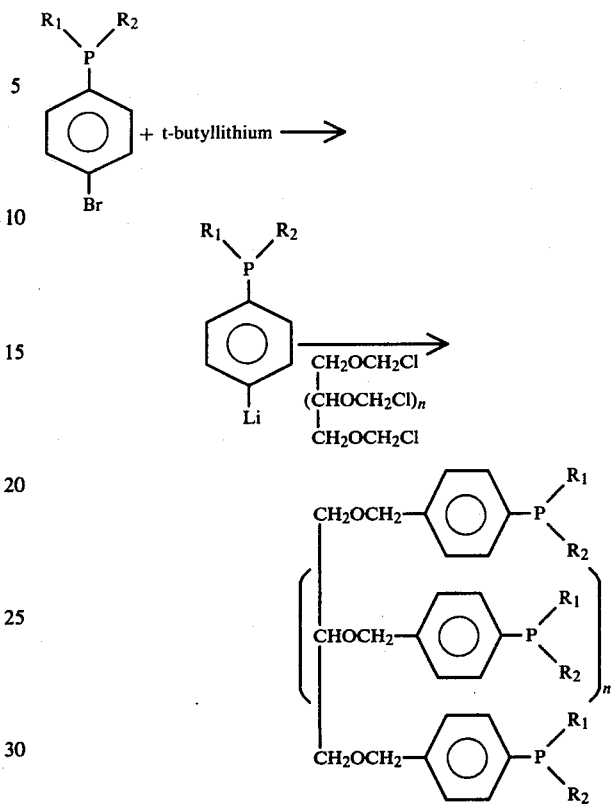

Glycols which are useful for preparing the compounds used in this invention are ethylene glycol, 1,2-propyleneglycol, 1,3-propyleneglycol, the butylglycols, the pentylglycols, and others. Ethyleneglycol and glycerol are most preferred starting materials.

Suitable diarylphosphine halides are those in which $R_1$ and $R_2$ are each selected from the group of phenyl, methylphenyl, ethylphenyl, methoxyphenyl, ethoxyphenyl, propoxyphenyl, chlorophenyl, bromophenyl, naphthyl, and the like. Preferred for use herein are those substituted aryls with a $C_1$ to $C_4$ alkyl or alkoxyl substituent, and the halogen-substituted alkyl derivatives. The most preferred phosphines for use in this reaction are those where $R_1$ and $R_2$ are both phenyl.

Compounds characterized by the moiety $$\left[ \begin{array}{c} HC-X-(CH_2)_y- \end{array} \bigcirc -P \begin{array}{c} R_1 \\ R_2 \end{array} \right]$$

wherein X is sulfur or nitrogen, and y is an integer from 1 to 2, and $R_1$ and $R_2$ are each selected from the group of aryl and substituted aryl can be prepared by a reaction sequence similar to that used to prepare the oxygen compounds.

The phosphine compound formed in Step 2 can be reacted with oligomeric or polymeric materials containing the moiety

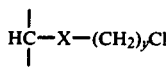

wherein X is selected from the group of sulfur or nitrogen. This moiety may be a derivative akin to the polyols, for example, ethanedithiol, ethylenediamine, 1,3-diaminopropane, 1,2,3-triaminopropane and similar compounds.

The hydrocarbyl polymeric phosphine compounds of the formula

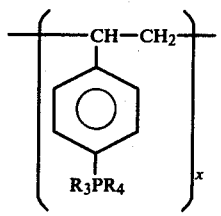

wherein x is an integer of from about 2 to about 15 and $R_3$ and $R_4$ are each selected from the group of aryl and substituted aryl can be prepared by the free radical or ionic polymerization of the corresponding styryl or alkylene derivative.

Foods fried in oils containing these polymeric phosphine hydroperoxide inhibiting compounds have an improved flavor over foods fried in oils containing conventional antioxidants, the tocopherols, BHA, BHT, etc. The food in which the fatty acid hydroperoxide formation has been inhibited have a flavor similar to that achieved by frying foods in an oxygen free atmosphere, that is, under a nitrogen or carbon dioxide atmosphere.

These hydroperoxide inhibiting compounds are particularly useful in oils and fats which contain unsaturated fatty acids. Oils which are polyunsaturated, especially safflower oil, sunflower seed oil, soybean oil, and corn oil are particularly susceptible to hydroperoxide formation. Foods fried in these oils, or mixtures thereof, or their corresponding hydrogenated oils, expecially need to be protected by the subject compounds.

The following example is illustrative of the invention, but is not meant to be limiting thereof.

EXAMPLE I

Deodorized safflower oil containing 500 ppm of 1,2,3-tris(p-diphenylphosphino)benzoxypropane is heated in an electric skillet to temperatures of about 325° F. Cut-up frying chicken is fried in this oil until thoroughly cooked. During the frying, the skillet and chicken are open to the atmosphere.

When this chicken is eaten, the overall taste is judged to be very good.

When the chicken prepared in Example I is compared with chicken fried in deodorized safflower oil not containing the 1,2,3-tris(p-diphenylphosphino)benzoxypropane, the chicken of Example I is judged to have the overall better flavor.

When poly(p-diphenylphosphino)styrene having a degree of polymerization of 8 is used to replace the hydroperoxide inhibiting compound of Example I, similar results are obtained.

What is claimed is:

1. A process for improving the flavor of fried foods containing fatty acids or esters thereof, comprising: frying said food in a fat or oil containing a safe an effective amount of a polymeric triarylphosphine compound having a molecular weight of about 600 to about 3000, wherein said polymeric triarylphosphine compound contains the moiety

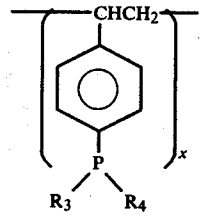

wherein x is an integer of from 2 to about 15 and $R_3$ and $R_4$ are each phenyl; or the moiety

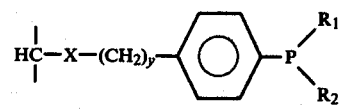

wherein X is selected from the group of oxygen, sulfur and nitrogen, $R_1$ and $R_2$ are each selected from the group of aryl and substituted aryl, and y is an integer from 1 to 4 said polymeric triarylphosphine serving to inhibit the build-up of hydroperoxides of fatty acids or esters thereof.

2. A process according to claim 1 wherein said polymeric phosphine compound is of the formula

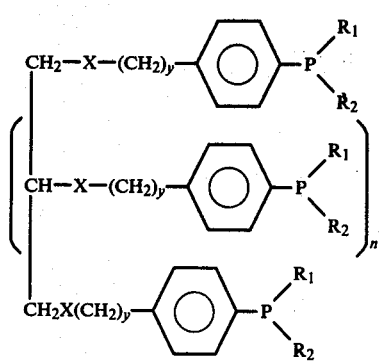

and n is an integer from 0 to 4.

3. A process according to claim 2 wherein said food is poultry.

4. A process according to claim 3 wherein said polymeric phosphine compound is of the formula

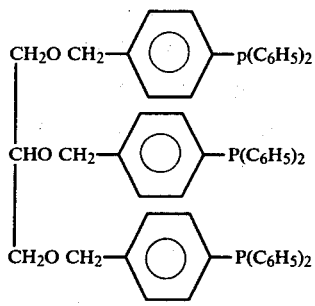
5. A process according to claim 1 wherein said polymeric phosphine compound is of the formula
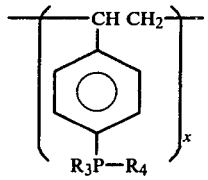
6. A process according to claim 5 wherein said food is poultry.
* * * * *

UNITED STATES PATENT AND TRADEMARK OFFICE
CERTIFICATE OF CORRECTION

PATENT NO. : 4,164,592
DATED : August 14, 1979
INVENTOR(S) : Bryan L. Madison et al.

It is certified that error appears in the above-identified patent and that said Letters Patent are hereby corrected as shown below:

Column 8, line 12, following " 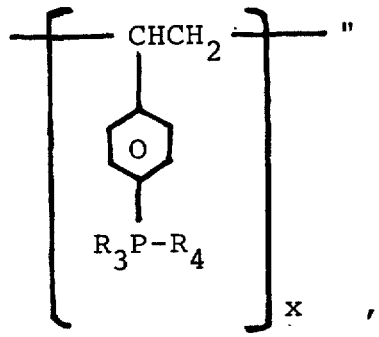 "

Claim 5 should read -- and x is 3 to 10 --.

Signed and Sealed this

Third Day of June 1980

[SEAL]

Attest:

SIDNEY A. DIAMOND

Attesting Officer        Commissioner of Patents and Trademarks